April 15, 1947.  L. A. MEACHAM  2,418,846
SUBMARINE DETECTION SYSTEM
Filed Dec. 3, 1943   5 Sheets-Sheet 1

INVENTOR
L. A. MEACHAM
BY
ATTORNEY

April 15, 1947.  L. A. MEACHAM  2,418,846
SUBMARINE DETECTION SYSTEM
Filed Dec. 3, 1943  5 Sheets-Sheet 4

INVENTOR
L.A. MEACHAM
BY
ATTORNEY

April 15, 1947.  L. A. MEACHAM  2,418,846
SUBMARINE DETECTION SYSTEM
Filed Dec. 3, 1943  5 Sheets-Sheet 5

INVENTOR
L. A. MEACHAM
BY
ATTORNEY

Patented Apr. 15, 1947

2,418,846

UNITED STATES PATENT OFFICE 2,418,846

SUBMARINE DETECTION SYSTEM

Larned A. Meacham, Summit, N. J., assignor to Bell Telephone Laboratories, Incorporated, New York, N. Y., a corporation of New York Application December 3, 1943, Serial No. 512,699

1 Claim. (Cl. 177—386)

This invention relates to ultrasonic detecting and ranging apparatus and means for operating a plan position indicator for locating objects in the water about a given point.

The object of the invention is to provide a continuous visual indication of obstructions within a given area such as the vessels in a convoy whereby the presence of an intruder may be detected.

In accordance with the present invention a submerged highly directive hydrophone transmitting a continuous ultrasonic compressional wave is rotated comparatively slowly in a horizontal plane and a receiver at the same location is also rotated comparatively swiftly so that the receiver will be in a position to receive the echo from a submerged object frequently enough to indicate the distance between the transmitter and the submerged object with a satisfactory degree of accuracy. The received echo will be indicated on an oscilloscope whose magnetic deflection controlling coils are rotated in synchronism and in step with the said receiver so that the spot at which the indication appears will indicate azimuth as well as range and thus clearly indicate the position of the object on a field constituting a plan of the area being searched.

The hydrophone and receiver when employed in a moving convoy at sea will be housed in a submerged trailer towed by one of the vessels in the convoy and electrically connected with the indicating apparatus in such vessel by electrical conductors forming part of or secured to the towing cable. Such apparatus may also be located in a stationary position within a limited area such as a bay or other sheltered body of water where a close watch is to be kept on the craft moving thereabouts. By means of a self-synchronizing device the controlling elements of the oscilloscope are kept in synchronism and in step with the position of the revolving receiver. Each time the hydrophone and receiver are pointed in the same direction a signal is transmitted to energize the sweep circuit of the oscilloscope so that the trace of each search by the receiver will be a spiral on the face thereof.

A feature of the invention is the use of a continuously transmitted beam of ultrasonic frequency continuously rotated and providing energy which may be reflected from a submerged object.

Another feature of the invention is a receiver rotated at comparatively high speed for receiving echoes reflected from such submerged objects.

Another feature of the invention is a means for starting a searching operation each time the rotating transmitter and rotating receiver both point in the same direction whereby the field is searched over a number of paths corresponding to the number of conjunctions occurring in a complete sweep of the transmitter over the field.

Another feature of the invention is the means for sweeping over the field with a searching receiver at such a rate that the echo from a submerged object is detected a number of times and the image created is composed of a corresponding plurality of signals.

Still another feature is a means for delineating an azimuth trace and a range trace and means for adjusting these traces until they intersect at the point where a submerged object is indicated whereby readings may be taken from calibrated scales associated therewith.

Other features will appear hereinafter.

The drawings consist of five sheets having eight figures as follows.

The fundamental plan is to have a transmitter of ultrasonic compressional waves capable of transmitting a highly directional beam, slowly rotate to transmit power over a horizontal plane and to have a receiver of like characteristics rotate at comparatively high speed in order to pick up echoes of reflected waves. By way of example the transmitter might sweep over its field once every ten seconds while the receiver might sweep over the same field thirty-six times per second so that while the transmitter is traversing the field once the receiver will traverse the same field three hundred and sixty times. Thus, if the beam width of the transmitter is five degrees the receiver will detect an echo five times, which, as will be shown hereinafter, is sufficient to produce a clear signal indication on the face of the tube indicator of the present invention.

Figure 1:
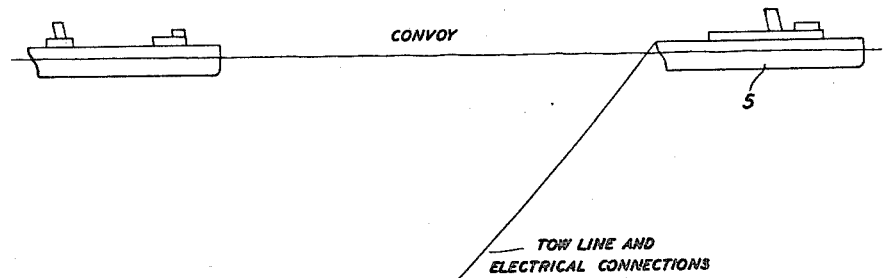
Fig. 1 is a schematic representation indicating how the submarine detection system may be used in a moving convoy at sea, with a trailer housing a transmitting and a receiving transducer towed by one of the vessels of the convoy and connected electrically to apparatus located in such vessel by conductors incorporated in and made part of of the tow line.
Figure 2:
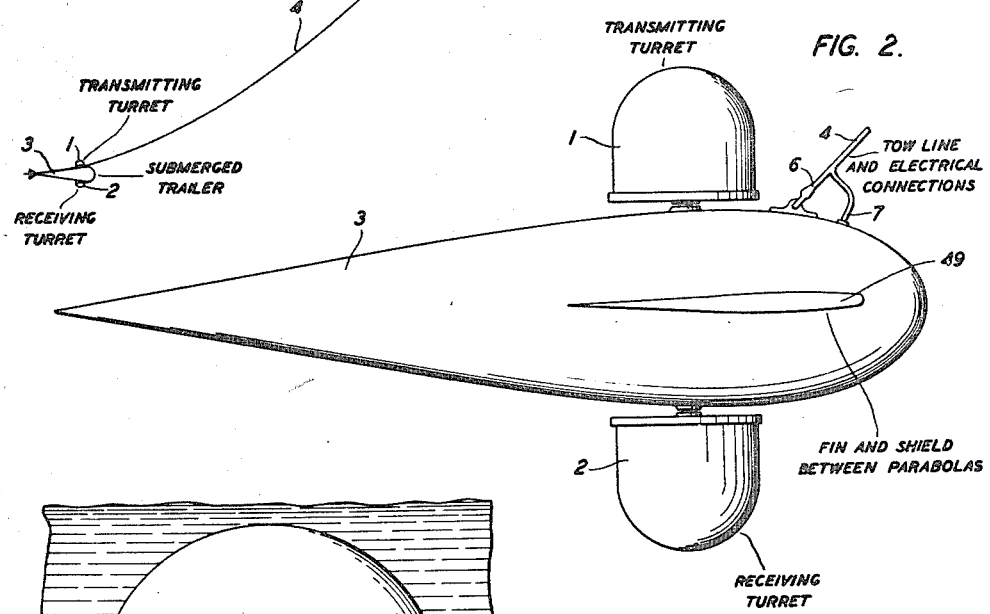
Fig. 2 is a side view of the trailer, larger than that shown in Fig. 1 but considerably smaller than the actual apparatus.
Figure 3:
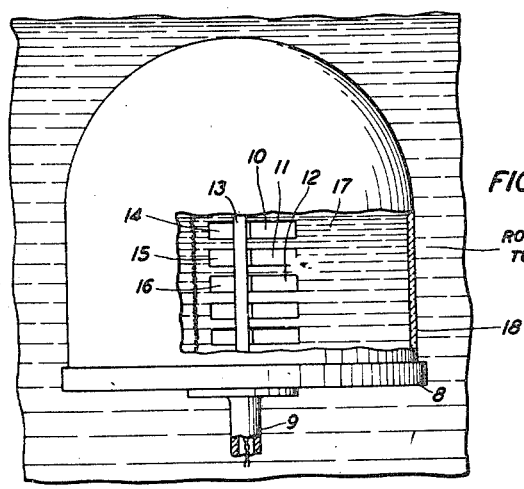
Fig. 3 is a view of one of the rotating turrets partly broken away to show the approximate location of the transducer apparatus housed within.

In Fig. 1 the invention is shown as employed in a convoy. The transmitter 1 and the receiver 2 are incorporated in a trailer 3, towed by a line 4 by a vessel 5. The tow line 4, as indicated in Fig. 2, comprises a line 6 and a cable of electrical conductors 7 whereby electrical communication is had between the apparatus in the trailer and the apparatus aboard the ship 5. The trailer may be designed in any appropriate manner so that the axis of the turrets 1 and 2 will remain substantially on a vertical line. The turrets will be designed to create as little disturbance in the water as possible. One form which these turrets may take is shown in Fig. 3 where the disc 8 mounted on a shaft 9 supports an electromechanical transducer comprising a plurality of piezo-electric crystals 10, 11 and 12, secured to a mounting plate 13, each having its own backing resonator 14, 15 and 16, respectively, and all immersed in a non-corrosive fluid 17 which has the same impedance and transmitting characteristics as sea water. This apparatus is housed in a bell-shaped dome 18 of some plastic material which again has the same impedance and transmitting characteristics so that the action of the crystals will be as though they were directly submerged in the sea water. The trailer 3 may be provided with fins, such as 49, serving the dual purpose of shields between the transmitting and receiving turrets and as movement stabilizers for controlling the movement of the trailer through the water.

Figure 4:
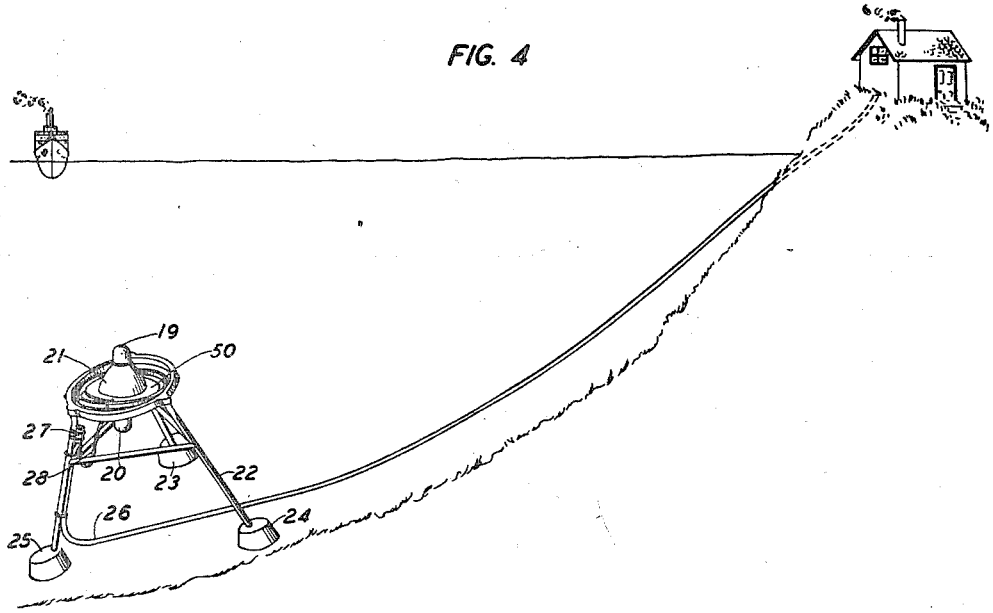
Fig. 4 is a schematic view showing how the apparatus housed in the trailer of Fig. 1 may be used in a stationary position at the bottom of a bay to watch the movement of surface craft and submarine vessels within a given area.
Figure 5:
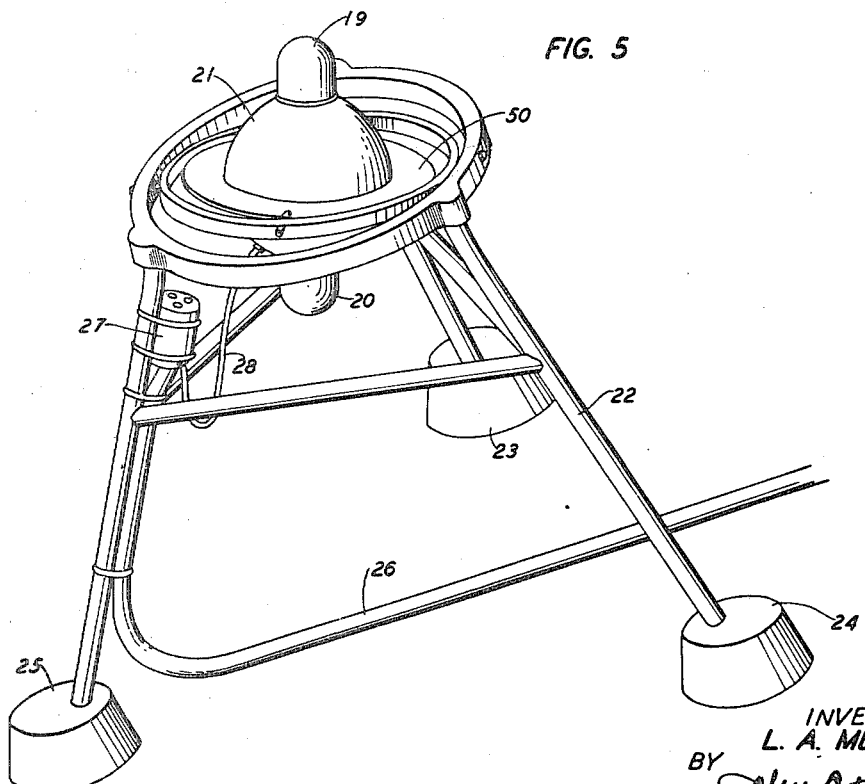
Fig. 5 is an enlarged view of the submerged apparatus showing the mechanical arrangements whereby the transmitting and receiving transducers are held on a vertical axis and other mechanical details thereof.

Fig. 4 shows how the apparatus of the trailer may be mounted in a stationary position at the bottom of a bay and connected by a submarine cable to cooperating apparatus in a shack on shore. The transmitting turret 19 and the receiving turret 20 may be mounted on a spherical shaped body 21 equivalent to the body 3 of the trailer and which is in turn mounted by a gimbal arrangement on a tripod 22 weighted by concrete blocks 23, 24 and 25. A horizontal fin 50 is provided as a shield against interference between the transmitter 19 and the receiver 20.

The submarine cable 26 may terminate in a junction box 27 from which a more flexible cable 28 is used for entrance into the body 21 of the apparatus, so that the proper position thereof will not be disturbed by pull on the cable. In order to make water-tight joints between the cables and the junction boxes the top end of the box 27 may be perforated, a rubber diaphragm may be disposed thereunder and the interior filled with an incompressible fluid such as castor oil whereby there will be no pressure gradient between the inside and the outside of such junction box.

Figure 6:
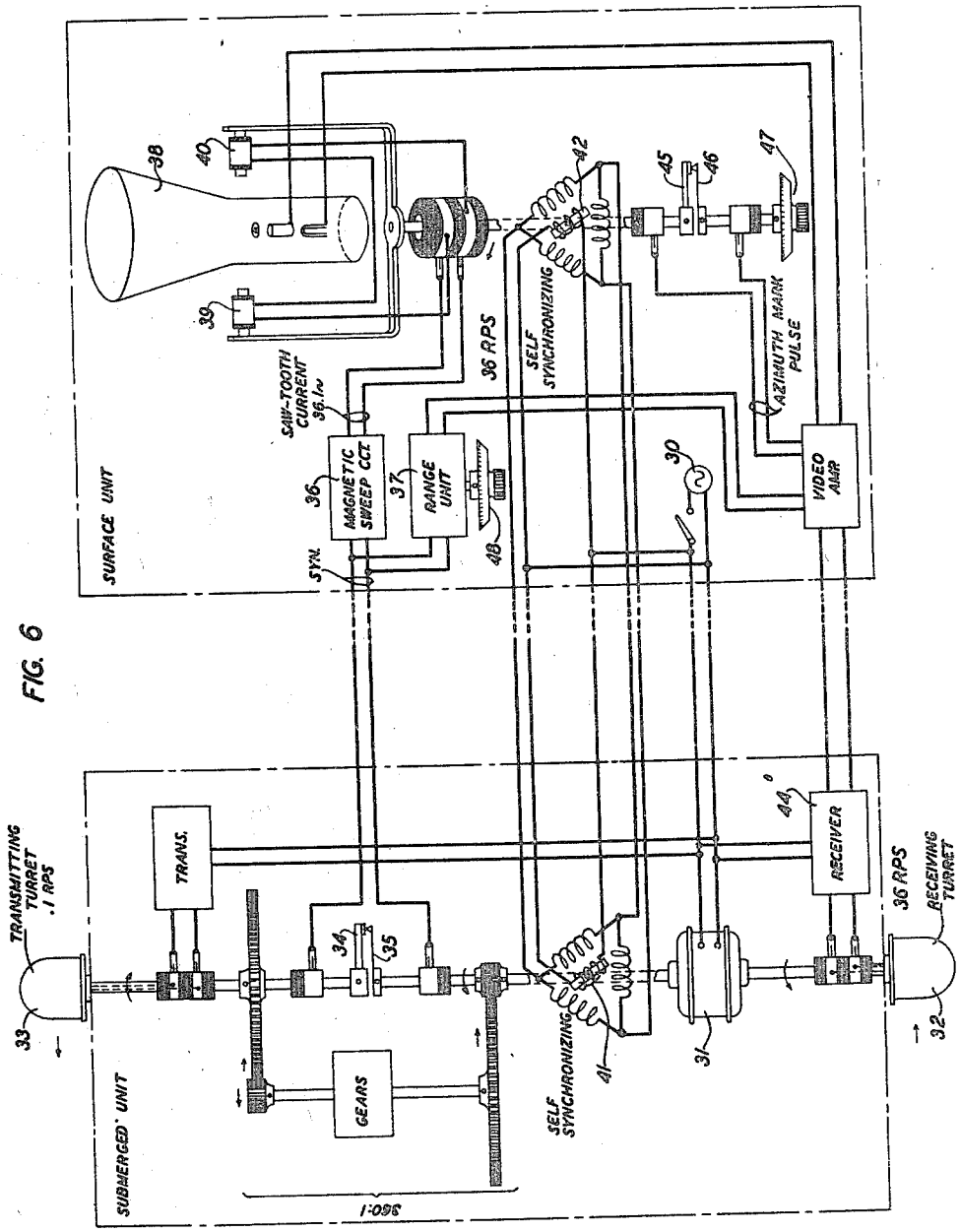
Fig. 6 is a schematic circuit diagram to explain the circuit operation of the system.

Fig. 6 is a schematic circuit diagram of the system. The apparatus within the broken line to the left represents the apparatus in the water at the end of the cable, the conductors between the two broken-line rectangles represent the cable and the apparatus in the right-hand broken-line rectangle represents that at the observation station in the ship 5 of Fig. 1 or the shack on land in Fig. 4.

A source of current 30 may be used to energize the system. A motor 31 is provided to provide movement in the submerged apparatus. This may directly drive the receiving turret 32 and may also drive the transmitting turret 33 through a set of gears of the proper ratio. A contact 34—35 is provided which closes momentarily when the directions of the beam patterns of the transmitter and receiver are lined up in the same direction. This contact provides a synchronizing pulse which starts the oscilloscope sweep 36 and starts a delayed pulse type of "range unit" 37 such as is used in radar systems, but having a longer maximum delay, in the order of $1/36$ of a second.

Figure 7:
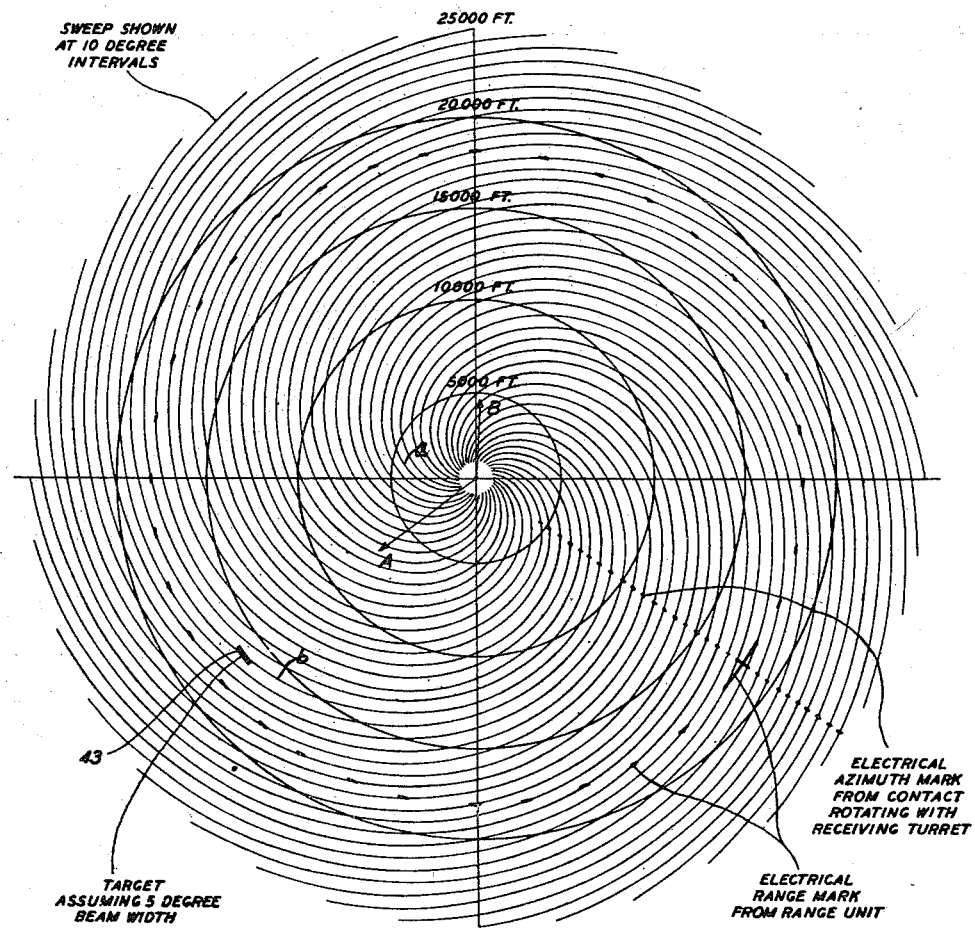
Fig. 7 is a drawing showing how the cathode ray beam is caused to move over the face of the cathode ray tube of Fig. 6.
Figure 8:
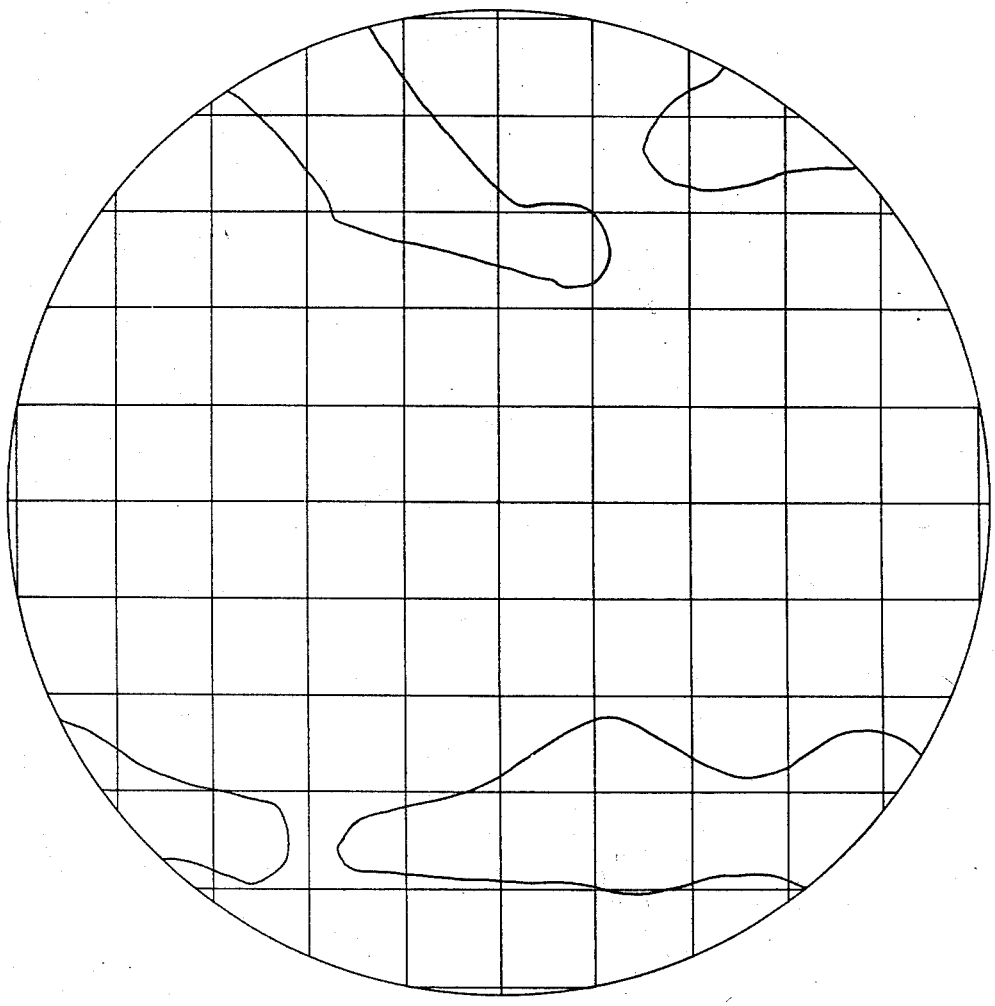
Fig. 8 is a diagram showing how a map of a local area may be prepared and drawn on the surface of the cathode ray tube or drawn on a transparent or translucent cap which is placed on such face when the apparatus is used in a stationary position as indicated in Fig. 4.

The plan position indicator oscilloscope 38 is of the magnetic deflection type. The deflection coils 39 and 40 are rotated in synchronism with the receiving transducer 32 by means of a self-synchronizing linkage 41—42. The magnetic sweep circuit 36 supplies a linear saw-tooth wave of current to the deflection coils 39 and 40 and the resulting sweep is a spiral as shown in Fig. 7. A video amplifier controls the intensity of the beam in the cathode ray tube 38. Normally the intensity of the beam is such that the traces, being produced through the saw-tooth energization of the deflecting magnets 39 and 40 while they are rotated about the tube, are either invisible or very faint. When the video amplifier is energized to increase the gain, the beam becomes intensified so that the trace accordingly becomes very bright. The video amplifier as shown is under control of the receiver 44, the range unit 37 and the pair of contacts 45—46 and the gain of this amplifier may be controlled from any one of these three points, and will therefore control the beam of the tube 38 to produce a bright spot at the point where on one of said spirals it happens to be at that instant. Each spiral covers three hundred and sixty degrees during one revolution of the receiving transducer and successive spirals lie approximately one degree apart. (Since with a gear ratio of 360 to 1 the receiving transducer passes the transmitting transducer three hundred and sixty-one times for one complete revolution of the transmitting transducer the spacing is precisely $360/361 = .997$ degree.) Thus, the screen is completely scanned in ten seconds, corresponding to a round trip of a compressional wave to a target at about 25,000 feet.

The manner in which targets are made to appear on the screen in correct range and azimuth positions is as follows. Consider the target shown as a rectangular spot 43 in Fig. 7. The wave energy producing this spot was transmitted while the beam was passing through a five degree sector, centered on the actual target. The spiral sweeps (five of them) which were produced during this brief interval, started from the center of the screen at instants when the receiving transducer 32 (and hence also the oscilloscope deflection coils) were in alignment with the transmitted beam. A typical one of these sweeps is marked $a$ in Fig. 7 and its initial direction is marked A.

The echo from the target reaches the receiving device after a delay corresponding to the range (about 16,000 feet in this example). During this interval, the transmitted beam, and with it the starting direction of the sweep, have rotated counter-clockwise from A to B. Echo energy continues to arrive during a period corresponding to about five sweeps, of which a typical one is labeled b. When this sweep (and the receiving turret) pass through direction A, the echo is able to energize the receiver 44 and this through its control over the video amplifier intensifies the beam thus, brightening a short segment of the sweep. The radial distance of this brightened segment from the center corresponds to the actual range of 16,000 feet. As the echo lasts over about five of the sweeps (assuming a point target) the spot on the screen is produced by this same number of adjacent brightened line segments.

It may be seen that the "depth" or radial dimension of the spot depends upon the beam width of the transmitting transducer, while the "width," or angular dimension, corresponds to that of the receiving transducer. Presumably the ultrasonic signals might undergo some dispersion, which of course would tend to reduce the resolution of the received pattern.

The production of range and azimuth indices is shown in Figs. 6 and 7. Pulses supplied by the range unit will be shown as a series of dots on a circular trace. Pulses produced by a movable azimuthal contact 45—46 will appear as a radial line of dots. In use these indices would be adjusted to intersect over a target and readings would be taken from calibrated range control 48 and azimuth control 47.

The range unit 37, like the magnetic sweep unit 36 is controlled by the periodical closure of the contacts 34—35 and by adjustment of the dial 48 may be controlled to produce a pulse at any given point in each sweep. This pulse through its control over the video amplifier will intensify the beam of the tube 38 and thus will produce a circular trace indicating a given range. Since the diameter of this circular trace may be changed at will through the manipulation of the dial 48, this range trace may be made to intersect the target indication.

The oscilloscope would require a long-persistence screen and an amber filter to provide as uniform illumination as possible. In darkened surroundings, clear patterns may be seen after considerably more than ten seconds, using available phosphors.

The main tactical advantage of this type of display is the ability to observe the whole area in the vicinity of a convoy or in a bay or harbor continuously, on a map revised regularly at ten-second intervals, and to have known targets appear in their true relative positions so that questionable objects could be readily distinguished.

What is claimed is:

A plan position indicator comprising a cathode ray tube having a long persistence screen, beam controlling means for increasing the intensity of the beam of said tube, said beam being normally of low intensity, beam deflecting magnets, means for rotating said magnets about said tube, means for sweeping a continuously transmitted beam of energy of ultrasonic frequency slowly about a given field, a self-synchronizing connection between said sweeping means and said deflecting magnet rotating means for moving said cathode ray beam in correspondence with said ultrasonic frequency beam, a receiver for scanning said field at a comparatively high rate, a connection between said receiver and said beam controlling means for intensifying said cathode ray beam to produce an image on said screen when an echo of said ultrasonic frequency beam is received, means for intensifying said cathode ray beam for producing an azimuth and a range trace and means for adjusting the position of said traces whereby the position of an echo may be fixed.

LARNED A. MEACHAM.

REFERENCES CITED

The following references are of record in the file of this patent:

UNITED STATES PATENTS

| Number | Name | Date |
|---|---|---|
| 2,231,929 | Lyman | Feb. 18, 1941 |
| 2,304,965 | Sproule | Dec. 15, 1942 |

FOREIGN PATENTS

| Number | Country | Date |
|---|---|---|
| 546,202 | British | July 2, 1942 |
| 497,147 | British | Dec. 9, 1938 |
| 542,634 | British | Jan. 21, 1942 |